US012200847B2

(12) United States Patent
Vanko

(10) Patent No.: US 12,200,847 B2
(45) Date of Patent: *Jan. 14, 2025

(54) INDUCTION HEATING ASSEMBLY FOR A VAPOUR GENERATING DEVICE

(71) Applicant: JT International SA, Geneva (CH)

(72) Inventor: Daniel Vanko, Watford (GB)

(73) Assignee: JT International SA (CH)

( * ) Notice: Subject to any disclaimer, the term of this patent is extended or adjusted under 35 U.S.C. 154(b) by 60 days.

This patent is subject to a terminal disclaimer.

(21) Appl. No.: 18/086,191

(22) Filed: Dec. 21, 2022

(65) Prior Publication Data

US 2023/0276543 A1 Aug. 31, 2023

Related U.S. Application Data

(63) Continuation of application No. 16/757,637, filed as application No. PCT/EP2018/086177 on Dec. 20, 2018, now Pat. No. 11,582,838.

(30) Foreign Application Priority Data

Dec. 28, 2017 (EP) .................................... 17210822

(51) Int. Cl.
*A24F 13/00* (2006.01)
*A24F 40/42* (2020.01)
(Continued)

(52) U.S. Cl.
CPC ............ *H05B 6/108* (2013.01); *A24F 40/42* (2020.01); *A24F 40/465* (2020.01);
(Continued)

(58) Field of Classification Search
CPC ....................................................... A24F 47/00
(Continued)

(56) References Cited

U.S. PATENT DOCUMENTS 2,870,439 A * 1/1959 Stinehelfer .......... H01Q 17/008
333/81 B
5,583,318 A * 12/1996 Powell ................ H05K 9/0088
250/515.1
(Continued)

FOREIGN PATENT DOCUMENTS

CA 3016252 A1 11/2017
CN 101116542 A 2/2008
(Continued)

OTHER PUBLICATIONS

International Search Report for Application No. PCT/EP2018/086177 dated Apr. 18, 2019, 2 pages.
(Continued)

*Primary Examiner* — Phuong K Dinh
(74) *Attorney, Agent, or Firm* — Lerner David LLP

(57) ABSTRACT

An induction heating assembly for a vapour generating device includes an induction coil and a heating compartment arranged to receive an induction heatable cartridge. A first electromagnetic shield layer is arranged outward of the induction coil and a second electromagnetic shield layer is arranged outward of the first electromagnetic shield layer. The first and second electromagnetic shield layers differ in one or both of their electrical conductivity and their magnetic permeability.

20 Claims, 4 Drawing Sheets

(51) Int. Cl.

| | |
|---|---|
| ***A24F 40/465*** | (2020.01) |
| ***A24F 40/485*** | (2020.01) |
| ***H01F 27/34*** | (2006.01) |
| ***H01F 27/36*** | (2006.01) |
| ***H05B 6/10*** | (2006.01) |
| *A24F 40/20* | (2020.01) |

(52) U.S. Cl.
CPC .......... *A24F 40/485* (2020.01); *H01F 27/346* (2013.01); *H01F 27/361* (2020.08); *A24F 40/20* (2020.01)

(58) Field of Classification Search
USPC .................................................. 131/328–329
See application file for complete search history.

(56) References Cited

U.S. PATENT DOCUMENTS

| | | | | |
|---|---|---|---|---|
| 5,613,505 | A | 3/1997 | Campbell et al. | |
| 5,866,884 | A | 2/1999 | Cornec et al. | |
| 7,185,659 | B2 | 3/2007 | Sharpe | |
| 9,326,547 | B2 | 5/2016 | Tucker et al. | |
| 9,717,277 | B2 * | 8/2017 | Mironov | H05B 6/108 |
| 11,582,838 | B2 * | 2/2023 | Vanko | A24F 40/42 |
| 2009/0260631 | A1 | 10/2009 | Aubonnet et al. | |
| 2009/0260641 | A1 | 10/2009 | Monsees et al. | |
| 2012/0234315 | A1 | 9/2012 | Li et al. | |
| 2014/0261493 | A1 | 9/2014 | Smith et al. | |
| 2014/0366900 | A1 | 12/2014 | Plojoux et al. | |
| 2015/0029130 | A1 | 1/2015 | Collins | |
| 2015/0090278 | A1 | 4/2015 | Schiff et al. | |
| 2015/0245669 | A1 | 9/2015 | Cadieux et al. | |
| 2015/0291301 | A1 | 10/2015 | Cadieux et al. | |
| 2015/0320116 | A1 | 11/2015 | Bleloch et al. | |
| 2016/0109115 | A1 | 4/2016 | Lipowicz | |
| 2016/0150828 | A1 | 6/2016 | Goldstein et al. | |
| 2017/0105452 | A1 | 4/2017 | Mironov et al. | |
| 2017/0181223 | A1 | 6/2017 | Sur et al. | |
| 2017/0231276 | A1 | 8/2017 | Mironov et al. | |
| 2017/0325506 | A1 | 11/2017 | Batista | |
| 2017/0349999 | A1 | 12/2017 | Burton et al. | |
| 2018/0070639 | A1 | 3/2018 | Chen et al. | |
| 2018/0332894 | A1 | 11/2018 | Gill et al. | |

FOREIGN PATENT DOCUMENTS

| | | | |
|---|---|---|---|
| CN | 201104488 | Y | 8/2008 |
| CN | 202133087 | U | 2/2012 |
| CN | 104095291 | A | 10/2014 |
| CN | 204425693 | U | 6/2015 |
| CN | 105595437 | A | 5/2016 |
| CN | 106455715 | A | 2/2017 |
| CN | 206137197 | U | 5/2017 |
| CN | 206227716 | U | 6/2017 |
| CN | 206237623 | U | 6/2017 |
| CN | 206443211 | U | 8/2017 |
| EP | 0703735 | B1 | 4/1996 |
| EP | 808080 | A1 | 11/1997 |
| EP | 916235 | A1 | 5/1999 |
| EP | 1850651 | A2 | 10/2007 |
| EP | 2164298 | A1 | 3/2010 |
| EP | 2312910 | A1 | 4/2011 |
| EP | 2381740 | A1 | 10/2011 |
| EP | 2410815 | A1 | 1/2012 |
| EP | 2444112 | A1 | 4/2012 |
| EP | 2515314 | A1 | 10/2012 |
| EP | 2842724 | A1 | 3/2015 |
| EP | 2897139 | A1 | 7/2015 |
| EP | 3038432 | A1 | 6/2016 |
| EP | 3041314 | A1 | 7/2016 |
| EP | 3243395 | A2 | 11/2017 |
| EP | 3506721 | A1 | 7/2019 |
| EP | 3506771 | A1 | 7/2019 |
| GB | 2543329 | A | 4/2017 |
| JP | H07097516 | B2 | 10/1995 |
| JP | 2000111258 | A | 4/2000 |
| JP | 2004298402 | A | 10/2004 |
| JP | 2005122983 | A | 5/2005 |
| JP | 2008547155 | A | 12/2008 |
| JP | 2013545474 | A | 12/2013 |
| JP | 2015021647 | A | 2/2015 |
| JP | 2016528874 | A | 9/2016 |
| JP | 2017515486 | A | 6/2017 |
| JP | 2019526247 | A | 9/2019 |
| KR | 20160031801 | A | 3/2016 |
| KR | 200482800 | Y1 | 3/2017 |
| TW | 201603723 | A | 2/2016 |
| WO | 9527411 | A1 | 10/1995 |
| WO | 2007100316 | A1 | 9/2007 |
| WO | 2008054070 | A1 | 5/2008 |
| WO | 2011022612 | A2 | 2/2011 |
| WO | 2012072790 | A1 | 6/2012 |
| WO | 2012098860 | A1 | 7/2012 |
| WO | 2015177043 | A1 | 11/2015 |
| WO | 2015177253 | A1 | 11/2015 |
| WO | 2017036950 | A2 | 3/2017 |
| WO | 2017036955 | A2 | 3/2017 |
| WO | 2017068095 | A1 | 4/2017 |
| WO | 2017072144 | A1 | 5/2017 |
| WO | 2017072148 | A1 | 5/2017 |
| WO | 2017184481 | A1 | 10/2017 |
| WO | 2017207582 | A1 | 12/2017 |
| WO | 2018041450 | A1 | 3/2018 |
| WO | 2019030301 | A1 | 2/2019 |
| WO | 2019030366 | A1 | 2/2019 |

OTHER PUBLICATIONS

Search Report dated Feb. 19, 2022 from Office Action for Taiwanese Application No. 107146066 issued Feb. 21, 2022. 1 pg.

Kuzmichev, A. et al., "Evaporators with Induction Heating and Their Applications" Advances in Induction and Microwave Heating of Mineral and Organic Materials, Feb. 2011, pp. 269-302.

Zinn, S. et al., "Flux Concentrators, Shields, and Susceptors" Elements of Induction Heating, Copyright © 1988 ASM International, https://www.proquest.com/legacydocview/EBC/3002409?accountid=131239, Jun. 1988, pp. 241-252.

Liu, X. et al., "An Analysis of a Double-layer Electromagnetic Shield for a Universal Contactless Battery Charging Platform" Department of Electronic Engineering, City University of Hong Kong, IEEE, Jun. 2005, pp. 1767-1772.

Tang, S.C. "Evaluation of the Shielding Effects on Printed—Circuit—Board Transformers Using Ferrite Plates and Copper Sheets" IEEE Transactions On Power Electronics, Nov. 2002, pp. 1080-1088, vol. 17, No. 6.

Liu, X. et al., "An Analysis of a Double-layer Electromagnetic Shield for a Universal Contactless Battery Charging Platform" IEEE 36th Power Electronics, Jun. 2005, pp. 1767-1772.

Sergeant, P. L. et al., "Optimizing Active and Passive Magnetic Shields in Induction Heating by a Genetic Algorithm" IEEE Transactions on Magnetics, Nov. 2003, pp. 3486-3496, vol. 39, No. 6.

Wikipedia, "Faraday Cage" Faraday Cage or Faraday shield is an enclosure used to block electromagnetic fields, Dec. 2017, pp. 1-6.

Zinn, S. et al., "Elements of Induction Heating" Design, Control and Application (EPRI Inc.) Apr. 1988, ASM International, pp. 243-245.

Ahn, S. et al., "Optimized shield design for reduction of EMF from wireless power transfer systems" Electronics Express, IEEE, Nov. 2014, pp. 1-9, vol. 11, No. 2.

Celozzi, S. et al., "Electromagnetic Shielding" Wiley-IEEE Press, Apr. 2008, pp. 26-28.

Mumetal, "Multiple Layer Shields" mu metal is available in many different gauges and indeed a single layer is suitable for most commercial applications, Sep. 2009, pp. 1-3.

Wikipedia, "Mu-metal" Mu-metal is a nickel-iron soft ferromagnetic alloy with very high permeability, which is used for shielding sensitive electronic equipment, Nov. 2017, pp. 1-4.

MuMetal, "Technical Data" The Wayback Machine, ASTM A753, Metal products, Magnetic Shield Corporation, Bensenville, IL, Dec. 2017, pp. 1-4.

(56) References Cited

OTHER PUBLICATIONS

Notice of Opposition for European Application No. 18838872.7, dated Jan. 26, 2024, pp. 1-5.
Notice of Opposition for European Application No. 18833872.7, dated Jan. 31, 2024, pp. 1-6.
Fang, X. et al., "Electromagnetic Compatibility in Integrative Motor System" National Defense Industry Press Beijing, Sep. 2017, pp. 1-10.
Rudnev, V." An Objective assessment of magnetic flux concentrators" Professor Induction, Inductoheat Group, Heat Treating Progress, Nov./Dec. 2004, pp. 19-23.
Yonghong, C. "Power Equipment Measurement-Sensing And Measurement-Control Technologies" China Electric Power Press, Apr. 2003, pp. 1-8.
Wikipedia Ferrite (Magnet), Oct. 2017, pp. 1-5.
Wikipedia, "Electromagnetic Shielding" Dec. 2017, pp. 1-6.
Wikipedia, " Electrical Conductor" Dec. 2017, pp. 1-5.
Notice of Opposition for European Application No. 23162039.4, dated Oct. 29, 24, pp. 1-7.
Notice of Opposition for European Application No. 23162039.4, dated Nov. 6, 24, pp. 1-14.

* cited by examiner

INDUCTION HEATING ASSEMBLY FOR A VAPOUR GENERATING DEVICE

CROSS-REFERENCE TO RELATED APPLICATIONS

The present application is a continuation of U.S. patent application Ser. No. 16/757,637, filed on Apr. 20, 2020, which is a national phase entry under 35 U.S.C. § 371 of International Application No. PCT/EP2018/086177, filed Dec. 20, 2018, published in English, which claims priority to European Application No. 17210822.7 filed Dec. 28, 2017, the disclosures of which are incorporated herein by reference.

TECHNICAL FIELD

The present disclosure relates to an induction heating assembly for a vapour generating device. Embodiments of the present disclosure also relate to a vapour generating device.

TECHNICAL BACKGROUND

Devices which heat, rather than burn, a vaporisable substance to produce a vapour for inhalation have become popular with consumers in recent years.

Such devices can use one of a number of different approaches to provide heat to the substance. One such approach is to provide a vapour generating device which employs an induction heating system. In such a device, an induction coil (hereinafter also referred to as an inductor) is provided with the device and a susceptor is provided with the vaporisable substance. Electrical energy is provided to the inductor when a user activates the device which in turn generates an alternating electromagnetic field. The susceptor couples with the electromagnetic field and generates heat which is transferred, for example by conduction, to the vaporisable substance and vapour is generated as the vaporisable substance is heated.

Such an approach has the potential to provide better control of heating and therefore vapour generation. However, a shortcoming of the use of an induction heating system is that leakage of the electromagnetic field generated by the induction coil may occur and there is, therefore, a need to address this shortcoming.

SUMMARY OF THE DISCLOSURE

According to a first aspect of the present disclosure, there is provided an induction heating assembly for a vapour generating device, the induction heating assembly comprising:

- an induction coil;
- a heating compartment arranged to receive an induction heatable cartridge;
- a first electromagnetic shield layer arranged outward of the induction coil;
- a second electromagnetic shield layer arranged outward of the first electromagnetic shield layer;
- wherein the first and second electromagnetic shield layers differ in one or both of their electrical conductivity and their magnetic permeability.

According to a second aspect of the present disclosure, there is provided an induction heating assembly for a vapour generating device, the induction heating assembly comprising:

- an induction coil;
- a heating compartment arranged to receive an induction heatable cartridge;
- an electromagnetic shield layer arranged outward of the induction coil, the electromagnetic shield layer comprising a ferrimagnetic, non-electrically conductive material; and
- a first insulating layer positioned between the induction coil and the electromagnetic shield layer, the first insulating layer comprising a material which is substantially non-electrically conductive and has a relative magnetic permeability substantially equal to 1.

According to a third aspect of the present disclosure, there is provided a vapour generating device comprising:

- an induction heating assembly according to the first aspect or the second aspect of the present disclosure;
- an air inlet arranged to provide air to the heating compartment; and
- an air outlet in communication with the heating compartment.

The one or more electromagnetic shield layers provide a compact, efficient and lightweight electromagnetic shield structure which reduces leakage of the electromagnetic field generated by the induction coil. This in turn allows the provision of a more compact induction heating assembly and, hence, a more compact vapour generating device.

Current flow in the one or more electromagnetic shield layers is suppressed which reduces heat generation in the shield structure (due to Joule heating) and thereby reduces energy losses. This provides a number of advantages, including: (i) a more effective transfer of electromagnetic energy from the induction coil to a susceptor associated with the induction heatable cartridge and, hence, improved heating of a vaporisable substance; (ii) a reduction in temperature, which leads to a reduction in the surface temperature of the vapour generating device and which mitigates potential damage to the device, e.g., by preventing plastics components within the device from melting due to excessively high temperatures; and (iii) protection for other electrical and electronic components within the vapour generating device.

In an embodiment, one of the electromagnetic shield layers comprises a ferrimagnetic, non-electrically conductive material and the other electromagnetic shield layer comprises an electrically conductive material.

The first electromagnetic shield layer may comprise a ferrimagnetic, non-electrically conductive material. Examples of suitable materials for the first electromagnetic shield layer include, but are not limited to, ferrite, Nickel Zinc Ferrite and mu-metal. The first electromagnetic shield layer may comprise a laminate structure and may, thus, itself comprise a plurality of layers. The layers may comprise the same material or may comprise a plurality of different materials, for example which are selected to provide the desired shielding properties. The first electromagnetic shield layer could, for example, comprise one or more layers of ferrite and one or more layers of an adhesive material.

The first electromagnetic shield layer may have a thickness between 0.1 mm and 10 mm. In some embodiments, the thickness may be between 0.1 mm and 6 mm, more preferably the thickness may be between 0.7 mm and 2.0 mm.

The first electromagnetic shield layer may provide a coverage area greater than 80% of the full surface area of the first electromagnetic shield layer. In some embodiments, the coverage area may be greater than 90%, possibly greater than 95%. As used herein, the full surface area means the surface area of a layer when the layer is fully intact, for example without any openings therein such as an air inlet or an air outlet. As used herein, the coverage area means the surface area excluding the area of any openings therein such as an air inlet or an air outlet.

The second electromagnetic shield layer may comprise an electrically conductive material. The second electromagnetic shield layer may comprise a mesh. The second electromagnetic shield layer may comprise a metal. Examples of suitable metals include, but are not limited to, aluminium and copper. The second electromagnetic shield layer may comprise a laminate structure and may, thus, itself comprise a plurality of layers. The layers may comprise the same material or may comprise a plurality of different materials, for example which are selected to provide the desired shielding properties.

The second electromagnetic shield layer may have a thickness between 0.1 mm and 0.5 mm. In some embodiments, the thickness may be between 0.1 mm and 0.2 mm. The second electromagnetic shield layer may have a resistance value of less than 30 mΩ. The resistance value may be less than 15 mΩ and may be less than 10 mΩ. These resistance values minimise heating and conductive losses in the second electromagnetic shield layer.

The second electromagnetic shield layer may provide a coverage area greater than 30% of the full surface area of the second electromagnetic shield layer. In some embodiments, the coverage area may be greater than 50%, possibly greater than 65%. The coverage area of the second electromagnetic shield layer may be noticeably lower than the coverage area of the first electromagnetic shield layer because, as noted above, the second electromagnetic shield layer may comprise a mesh.

The second electromagnetic shield layer may comprise a substantially cylindrical shield portion and may comprise a substantially cylindrical sleeve. The cylindrical shield portion may include a circumferential gap. Thus, the second electromagnetic shield layer may comprise a cylindrical sleeve in which the circumferential gap extends along the entirety of the sleeve in the axial direction. The circumferential gap provides an electrical break in the second electromagnetic shield layer thereby limiting the induced current at this point.

In some embodiments, there is no electrically conductive material between the induction coil and the first electromagnetic shield layer. Such an arrangement helps to suppress current flow in the shield structure.

The induction heating assembly may comprise a first insulating layer. The first insulating layer may be positioned between the induction coil and the first electromagnetic shield layer. The first insulating layer may be substantially non-electrically conductive and may have a relative magnetic permeability substantially equal to 1. A relative magnetic permeability substantially equal to 1 means that the relative magnetic permeability may be in the range 0.99 to 1.01, preferably 0.999 to 1.001.

The first insulating layer may comprise exclusively a material which is substantially non-electrically conductive and which has a relative magnetic permeability substantially equal to 1. Alternatively, the first insulating layer may comprise substantially a material which is substantially non-electrically conductive and has a relative magnetic permeability substantially equal to 1. The first insulating layer may, for example, comprise a laminate structure or a composite structure and may, thus, itself comprise a plurality of layers and/or a mixture of particles/elements. The layers or mixture of particles/elements may comprise the same material or may comprise a plurality of different materials, for example one or more materials selected from the group consisting of a non-electrically conductive material, an electrically conductive material and a ferrimagnetic material. It will be understood that such a combination of materials would be provided in proportions which ensure that the first insulating layer comprises 'substantially' a material which is substantially non-electrically conductive and has a relative magnetic permeability substantially equal to 1. In one embodiment, the material of the first insulating layer may comprise air.

The first insulating layer may have a thickness between 0.1 mm and 10 mm. In some embodiments, the thickness may be between 0.5 mm and 7 mm and may possibly be between 1 mm and 5 mm. Such an arrangement, including the first insulating layer, ensures that an optimal alternating electromagnetic field is generated by the induction coil.

The first insulating layer may provide a coverage area greater than 90% of the full surface area of the first insulating layer. In some embodiments, the coverage area may be greater than 95%, possibly greater than 98%.

The induction heating assembly may further comprise an air passage from an air inlet to the heating compartment and the air passage may form at least part of the first insulating layer. This simplifies the construction of the induction heating assembly and allows the size of the induction heating assembly and, hence, of the vapour generating device, to be minimised. Heat from the induction coil may also be transferred to air flowing through the air passage, thus improving the efficiency of the induction heating assembly and, hence, of the vapour generating device due to preheating of the air.

The induction heating assembly may further comprise a housing and the housing may comprise the second electromagnetic shield layer. Such an arrangement, in which the housing acts as the second electromagnetic shield layer, leads to a reduced component count and, hence, to an improvement in the size, weight and production cost of the induction heating assembly and, thus, of the vapour generating device.

One or both of the first and second electromagnetic shield layers may be arranged circumferentially around the induction coil and at both first and second axial ends of the induction coil so as to substantially surround the induction coil. The shielding effect is, thus, maximised.

In one embodiment, the induction heating assembly may further comprise:

- an inhalation passage extending between the heating compartment and an air outlet at a first axial end of the induction heating assembly; wherein
- a portion of the inhalation passage extends in a direction substantially perpendicular to the axial direction between the heating compartment and air outlet; and
- one or both of the first and second electromagnetic shield layers runs adjacent to said portion of the inhalation passage such that the first axial end of the induction coil is substantially covered by the electromagnetic shield layers.

Such an arrangement of the first and/or second electromagnetic shield layers ensures that maximum coverage of the first axial end of the induction coil is provided by the first and/or second electromagnetic shield layers and that the shielding effect is maximised.

The induction heating assembly may further comprise a shielding coil which may be positioned at one or both of the first and second axial ends of the induction coil possibly within the first or second electromagnetic shield layers. The shielding coil can operate as a low pass filter thereby reducing component count and, hence, leading to an improvement in the size, weight and production cost of the induction heating assembly and, thus, of the vapour generating device.

The induction heating assembly may further comprise an outer housing layer which may surround the first and second electromagnetic shield layers. This ensures that the outer surface of the vapour generating device does not become hot and that a user can handle the device without any discomfort.

In one embodiment, the induction heating assembly may further comprise a second insulating layer. The second insulating layer may be substantially non-electrically conductive and may have a relative magnetic permeability less than, or substantially equal to, 1. A relative magnetic permeability substantially equal to 1 means that the relative magnetic permeability may be in the range 0.99 to 1.01, preferably 0.999 to 1.001. A first part of the second insulating layer may lie, in use, between the induction coil and a vaporisable substance inside the induction heatable cartridge. Such an arrangement, including the second insulating layer, ensures that an optimal coupling between the susceptor and the alternating electromagnetic field is achieved. A second part of the second insulating layer may be arranged outwardly of the induction coil and may be positioned between the induction coil and the first electromagnetic shield layer.

The second insulating layer may comprise exclusively a material which is substantially non-electrically conductive and which has a relative magnetic permeability less than, or substantially equal to, 1. Alternatively, the second insulating layer may comprise substantially a material which is substantially non-electrically conductive and has a relative magnetic permeability less than, or substantially equal to, 1. The second insulating layer may, for example, comprise a laminate structure or a composite structure and may, thus, itself comprise a plurality of layers and/or a mixture of particles/elements. The layers or mixture of particles/elements may comprise the same material or may comprise a plurality of different materials, for example one or more materials selected from the group consisting of a non-electrically conductive material, an electrically conductive material and a ferrimagnetic material. It will be understood that such a combination of materials would be provided in proportions which ensure that the second insulating layer comprises 'substantially' a material which is substantially non-electrically conductive and has a relative magnetic permeability less than, or substantially equal to, 1.

In one embodiment, the second insulating layer may comprise a plastics material. The plastics material may comprise polyether ether ketone (PEEK) or any other material which has a very high thermal resistivity (insulator) and a low thermal mass. It will be understood that after a period of non-use of the vapour generating device, the components of the device, and hence of the induction heating assembly, will cool until they reach ambient temperature. Upon initial activation of the vapour generating device when the second insulating layer is contacted by heated vapour, condensation may form on the second insulating layer due to contact between the relatively hot vapour and the cooler second insulating layer, and the condensation will remain until the temperature of the second insulating layer has increased. The use of a material having a very high thermal resistivity and a low thermal mass minimises condensation because it ensures that the second insulating layer heats up as rapidly as possible following initial activation of the device when contacted by the heated vapour.

The induction heating assembly may be arranged to operate in use with a fluctuating electromagnetic field having a magnetic flux density of between approximately 20 mT and approximately 2.0 T at the point of highest concentration.

The induction heating assembly may include a power source and circuitry which may be configured to operate at a high frequency. The power source and circuitry may be configured to operate at a frequency of between approximately 80 kHz and 500 kHz, possibly between approximately 150 kHz and 250 kHz, and possibly at approximately 200 kHz. The power source and circuitry could be configured to operate at a higher frequency, for example in the MHz range, depending on the type of inductively heatable susceptor that is used.

Whilst the induction coil may comprise any suitable material, typically the induction coil may comprise a Litz wire or a Litz cable.

Whilst the induction heating assembly may take any shape and form, it may be arranged to take substantially the form of the induction coil, to reduce excess material use. The induction coil may be substantially helical in shape.

The circular cross-section of a helical induction coil facilitates the insertion of an induction heatable cartridge into the induction heating assembly and ensures uniform heating of the induction heatable cartridge. The resulting shape of the induction heating assembly is also comfortable for the user to hold.

The induction heatable cartridge may comprise one or more induction heatable susceptors. The or each susceptor may comprise one or more, but not limited, of aluminium, iron, nickel, stainless steel and alloys thereof, e.g. Nickel Chromium or Nickel Copper. With the application of an electromagnetic field in its vicinity, the or each susceptor may generate heat due to eddy currents and magnetic hysteresis losses resulting in a conversion of energy from electromagnetic to heat.

The induction heatable cartridge may comprise a vapour generating substance inside an air permeable shell. The air permeable shell may comprise an air permeable material which is electrically insulating and non-magnetic. The material may have a high air permeability to allow air to flow through the material with a resistance to high temperatures. Examples of suitable air permeable materials include cellulose fibres, paper, cotton and silk. The air permeable material may also act as a filter. Alternatively, the induction heatable cartridge may comprise a vapour generating substance wrapped in paper. Alternatively, the induction heatable cartridge may comprise a vapour generating substance held inside a material that is not air permeable, but which comprises appropriate perforations or openings to allow air flow. Alternatively, the induction heatable cartridge may consist of the vapour generating substance itself. The induction heatable cartridge may be formed substantially in the shape of a stick.

The vapour generating substance may be any type of solid or semi-solid material. Example types of vapour generating solids include powder, granules, pellets, shreds, strands, particles, gel, strips, loose leaves, cut filler, porous material, foam material or sheets. The substance may comprise plant derived material and in particular, the substance may comprise tobacco.

The vapour generating substance may comprise an aerosol-former. Examples of aerosol-formers include polyhydric alcohols and mixtures thereof such as glycerine or propylene glycol. Typically, the vapour generating substance may comprise an aerosol-former content of between approximately 5% and approximately 50% on a dry weight basis. In some embodiments, the vapour generating substance may comprise an aerosol-former content of approximately 15% on a dry weight basis.

Also, the vapour generating substance may be the aerosol-former itself. In this case, the vapour generating substance may be a liquid. Also, in this case, the induction heatable cartridge may include a liquid retaining substance (e.g. a bundle of fibres, porous material such as ceramic, etc.) which retains the liquid to be vaporized and allows a vapour to be formed and released/emitted from the liquid retaining substance, for example towards the air outlet for inhalation by a user.

Upon heating, the vapour generating substance may release volatile compounds. The volatile compounds may include nicotine or flavour compounds such as tobacco flavouring.

Since the induction coil produces an electromagnetic field when operating to heat a susceptor, any member comprising an induction heatable susceptor will be heated when placed in proximity to the induction coil in operation, and as such there is no restriction on the shape and form of the induction heatable cartridge being received in the heating compartment. In some embodiments, the induction heatable cartridge may be cylindrical in shape and as such the heating compartment is arranged to receive a substantially cylindrical vaporisable article.

The ability of the heating compartment to receive a substantially cylindrical induction heatable cartridge to be heated is advantageous as, often, vaporisable substances and tobacco products in particular, are packaged and sold in a cylindrical form.

DETAILED DESCRIPTION OF EMBODIMENTS

Embodiments of the present disclosure will now be described by way of example only and with reference to the accompanying drawings.

Figure 1:
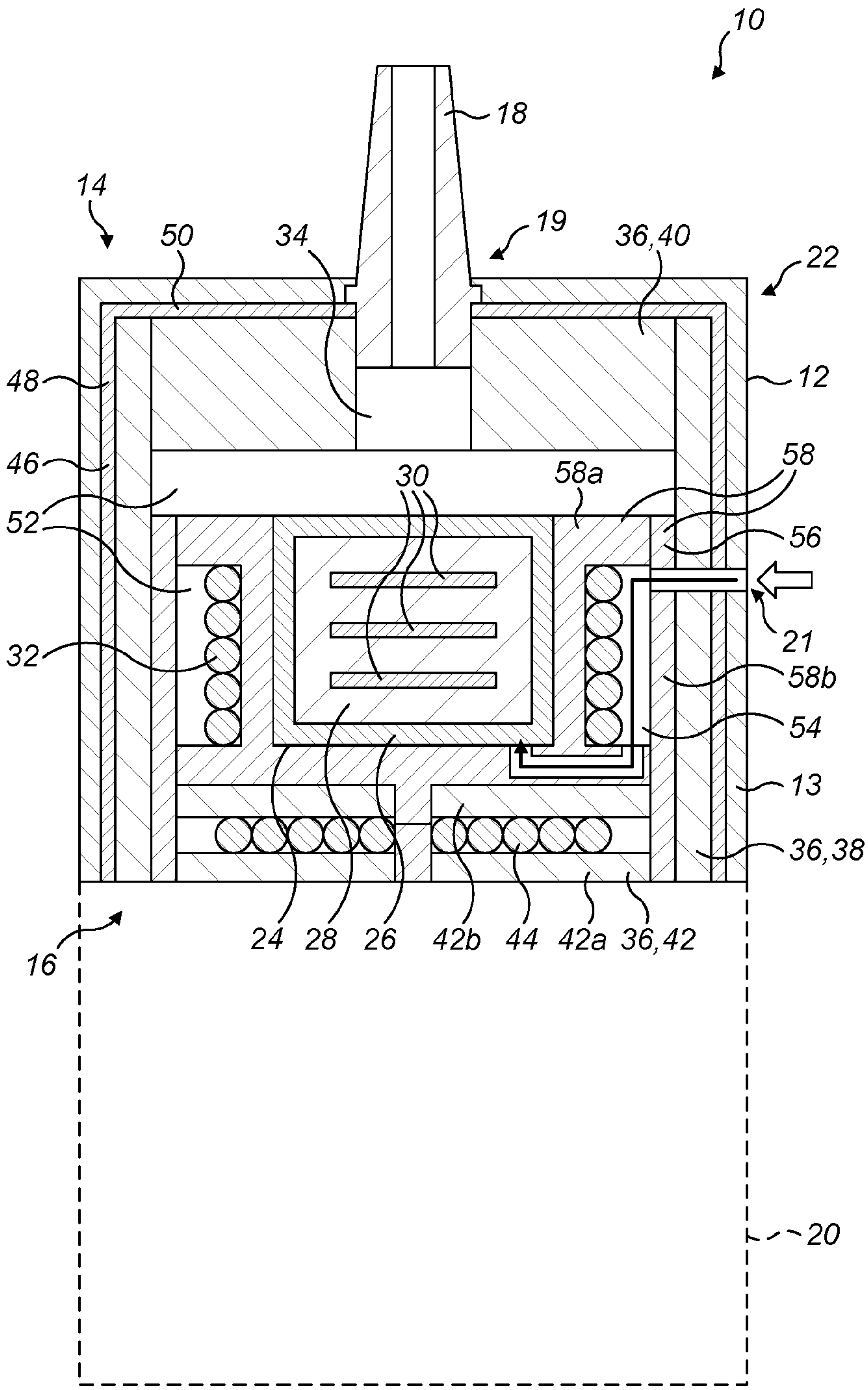
FIG. 1 is a diagrammatic illustration of a vapour generating device comprising an induction heating assembly according to a first embodiment of the present disclosure.

Referring initially to FIG. 1, there is shown diagrammatically a vapour generating device 10 according to an example of the present disclosure. The vapour generating device 10 comprises a housing 12. When the device 10 is used for generating vapour to be inhaled, a mouthpiece 18 may be installed on the device 10 at an air outlet 19. The mouthpiece 18 provides the ability for a user to easily inhale vapour generated by the device 10. The device 10 includes a power source and control circuitry, designated by the reference numeral 20, which may be configured to operate at high frequency. The power source typically comprises one or more batteries which could, for example, be inductively rechargeable. The device 10 also includes an air inlet 21.

The vapour generating device 10 comprises an induction heating assembly 22 for heating a vapour generating (i.e. vaporisable) substance. The induction heating assembly 22 comprises a generally cylindrical heating compartment 24 which is arranged to receive a correspondingly shaped generally cylindrical induction heatable cartridge 26 comprising a vaporisable substance 28 and one or more induction heatable susceptors 30. The induction heatable cartridge 26 typically comprises an outer layer or membrane to contain the vaporisable substance 28, with the outer layer or membrane being air permeable. For example, the induction heatable cartridge 26 may be a disposable cartridge 26 containing tobacco and at least one induction heatable susceptor 30.

The induction heating assembly 22 comprises a helical induction coil 32 which extends around the cylindrical heating compartment 24 and which can be energised by the power source and control circuitry 20. As will be understood by those skilled in the art, when the induction coil 32 is energised, an alternating and time-varying electromagnetic field is produced. This couples with the one or more induction heatable susceptors 30 and generates eddy currents and/or hysteresis losses in the one or more induction heatable susceptors 30 causing them to heat up. The heat is then transferred from the one or more induction heatable susceptors 30 to the vaporisable substance 28, for example by conduction, radiation and convection.

The induction heatable susceptor(s) 30 can be in direct or indirect contact with the vaporisable substance 28, such that when the susceptors 30 is/are inductively heated by the induction coil 32 of the induction heating assembly 22, heat is transferred from the susceptor(s) 30 to the vaporisable substance 28, to heat the vaporisable substance 28 and produce a vapour. The vaporisation of the vaporisable substance 28 is facilitated by the addition of air from the surrounding environment through the air inlet 21. The vapour generated by heating the vaporisable substance 28 then exits the heating compartment 24 through the air outlet 19 and may, for example, be inhaled by a user of the device 10 through the mouthpiece 18. The flow of air through the heating compartment 24, i.e. from the air inlet 21, through the heating compartment 24, along an inhalation passage 34 of the induction heating assembly 22, and out of the air outlet 19, can be aided by negative pressure created by a user drawing air from the air outlet 19 side of the device 10 using the mouthpiece 18.

The induction heating assembly 22 comprises a first electromagnetic shield layer 36 arranged outward of the induction coil 32 and typically formed of a ferrimagnetic, non-electrically conductive material such as ferrite, Nickel Zinc Ferrite or mu-metal. In the embodiment shown in FIG. 1, the first electromagnetic shield layer 36 comprises a substantially cylindrical shield portion 38, for example in the form of a substantially cylindrical sleeve, which is positioned radially outwardly of the helical induction coil 32 so as to extend circumferentially around the induction coil 32. The substantially cylindrical shield portion 38 typically has a layer thickness (in the radial direction) of between approximately 1.7 mm and 2 mm. The first electromagnetic shield layer 36 also comprises a first annular shield portion 40, provided at a first axial end 14 of the induction heating assembly 22, which has a layer thickness (in the axial direction) of approximately 5 mm. The first electromagnetic shield layer 36 also comprises a second annular shield portion 42, provided at a second axial end 16 of the induction heating assembly 22. It will be noted that the second annular shield portion 42 comprises first and second layers 42*a*, 42*b* of shielding material between which an optional shielding coil 44 is positioned. In alternative embodiments, the second annular shield portion 42 may comprise a single layer of shielding material, either with or without the shielding coil 44 present.

The induction heating assembly 22 comprises a second electromagnetic shield layer 46 arranged outward of the first electromagnetic shield layer 36. The second electromagnetic shield layer 46 typically comprises an electrically conductive material, for example a metal such as aluminium or copper, and may be in the form of a mesh.

In the embodiment shown in FIG. 1, the second electromagnetic shield layer 46 comprises a substantially cylindrical shield portion 48, for example in the form of a substantially cylindrical sleeve having an axially extending circumferential gap (not shown), and an annular shield portion 50, provided at the first axial end 14 of the induction heating assembly 22. The substantially cylindrical shield portion 48 and the annular shield portion 50 may be integrally formed as a single component. In some embodiments, the second electromagnetic shield layer 46 has a layer thickness of approximately 0.15 mm. The resistance value of the second electromagnetic shield layer 46 is selected to minimise heating and conductive losses in the second electromagnetic shield layer 46, and may for example have a value of less than 30 mΩ.

The induction heating assembly 22 comprises an outer housing layer 13 which surrounds the first and second electromagnetic shield layers 36, 46 and which constitutes the outermost layer of the housing 12. In an alternative embodiment (not illustrated), the outer housing layer 13 could be omitted such that the second electromagnetic shield layer 46 constitutes the outermost layer of the housing 12.

The induction heating assembly 22 comprises a first insulating layer 52 which is positioned between the induction coil 32 and the first electromagnetic shield layer 36. The first insulating layer 52 is substantially non-electrically conductive and has a relative magnetic permeability substantially equal to 1, and in the illustrated embodiment the first insulating layer 52 comprises air.

Figure 2:
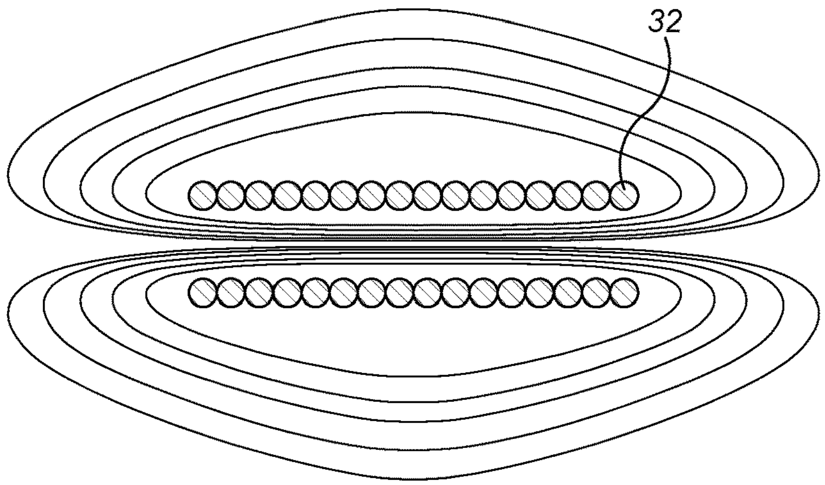
FIGS. 2 to 4 are diagrammatic illustrations of the shielding effect obtained by the use of an electromagnetic shield layer in accordance with aspects of the present disclosure and the variation in magnetic field strength that is obtained by the use of an insulating layer in accordance with aspects of the present disclosure.
Figure 3:
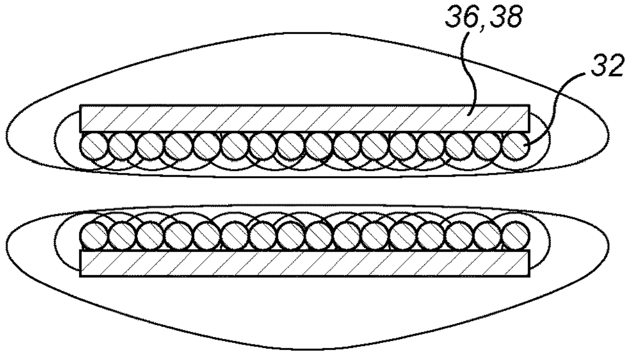
Figure 4:
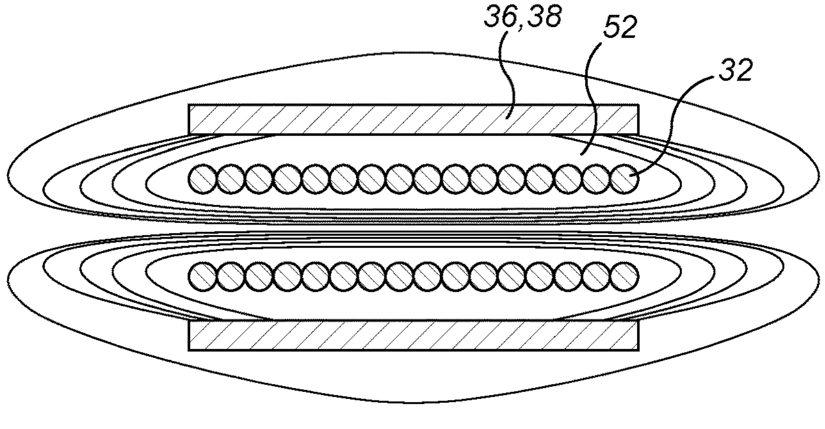

The provision of a first insulting layer 52 between the induction coil 32 and the first electromagnetic shield layer 36 advantageously ensures that an optimal electromagnetic field is generated for coupling with the susceptor(s) 30 of the induction heatable cartridge 26 and this is illustrated diagrammatically in FIGS. 2 to 4. For example, FIG. 2 illustrates diagrammatically the electromagnetic field that is generated by a helical induction coil 32 in the absence of the electromagnetic shield layers 36, 46 described above. FIG. 3, on the other hand, illustrates diagrammatically the electromagnetic field that is generated by the helical induction coil 32 when the first electromagnetic shield layer 36 described above, and in particular the substantially cylindrical shield portion 38, is positioned either very close to, or in contact with, the induction coil 32, in other words when the abovementioned first insulating layer 52 is not provided. It can be readily seen in FIG. 3 that although the first electromagnetic shield layer 36 reduces the strength of the electromagnetic field in a region radially outwardly of the first electromagnetic shield layer 36, and thereby reduces leakage of the electromagnetic field, it also reduces the strength of the electromagnetic field in a region radially inwardly of the induction coil 32 where the induction heatable cartridge 26 is positioned in use. This is undesirable because it adversely affects the coupling of the electromagnetic field with the susceptor(s) 30 of the induction heatable cartridge 26 and reduces heating efficiency. Referring finally to FIG. 4, it will be apparent that when a first insulating layer 52 in accordance with aspects of the present disclosure is positioned between the induction coil 32 and the first electromagnetic shield layer 36, the first electromagnetic shield layer 36, and in particular the substantially cylindrical shield portion 38, reduces the strength of the electromagnetic field in a region radially outwardly of the first electromagnetic shield layer 36, and thereby reduces leakage of the electromagnetic field, in a similar manner to that shown in FIG. 3. However, in contrast to FIG. 3, the strength of the electromagnetic field in the region radially inwardly of the induction coil 32, where the induction heatable cartridge 26 is positioned in use, is not reduced thereby ensuring optimum coupling of the electromagnetic field with the susceptor(s) 30 of the induction heatable cartridge 26 and maximising heating efficiency.

Referring again to FIG. 1, it will be noted that the induction heating assembly 22 comprises an annular air passage 54 which extends from the air inlet 21 to the heating compartment 24. The air passage 54 is positioned radially outwardly of the induction coil 32, between the induction coil 32 and the first electromagnetic shield layer 36, and the first insulating layer 52 is formed at least in part by the air passage 54.

The induction heating assembly 22 further comprises a second insulating layer 58. It will be seen in FIG. 1 that a first part 58*a* of the second insulating layer 58 is arranged on the inner side of the induction coil 32 so that it lies between the induction coil 32 and the vaporisable substance 28 inside the induction heatable cartridge 26. It will also be seen in FIG. 1 that a second part 58*b* of the second insulating layer 58 is arranged outwardly of the induction coil 32 and is positioned between the induction coil 32 and the first electromagnetic shield layer 36. In the illustrated embodiment, the second part 58*b* comprises a cylindrical sleeve 56 positioned radially outwardly of the annular air passage 54, adjacent to the first electromagnetic shield layer 36. The second insulating layer 58 is substantially non-electrically conductive and has a relative magnetic permeability less than, or substantially equal to, 1, and typically comprises a plastics material such as PEEK. As will be readily appreciated from FIG. 1, the first part 58*a* of the second insulating layer 58 defines the internal volume of the heating compartment 24 in which the induction heatable cartridge 26 is received in use.

Figure 5:
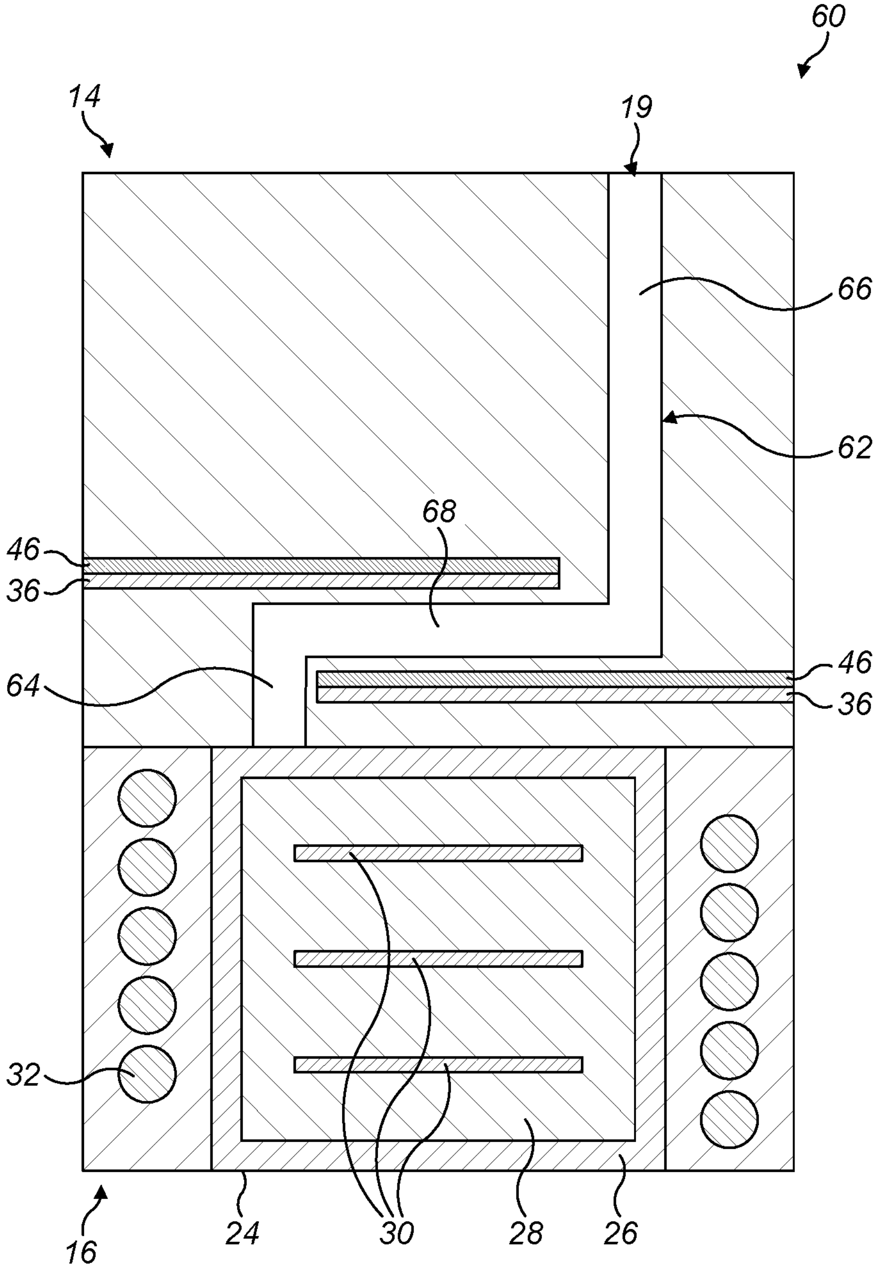
FIG. 5 is a diagrammatic illustration of part of an induction heating assembly according to a second embodiment of the present disclosure.

Referring now to FIG. 5, there is shown part of a second embodiment of an induction heating assembly 60 for a vapour generating device 10. The induction heating assembly 60 shown in FIG. 5 is similar to the induction heating assembly 22 shown in FIG. 1 and corresponding components are identified using the same reference numerals. It should be noted that the substantially cylindrical shield portions 38, 48 of the first and second electromagnetic shield layers 36, 46 have been omitted from FIG. 5.

The induction heating assembly 60 comprises an inhalation passage 62 which extends from the heating compartment 24 to the air outlet 19 at the first axial end 14 of the induction heating assembly 60. The inhalation passage 62 comprises first and second axial portions 64, 66 which extend in a direction substantially parallel to the axial direction between the heating compartment 24 and the air outlet 19. The inhalation passage 62 also comprises a transverse portion 68 which extends in a direction substantially perpendicular to the axial direction between the heating compartment 24 and the air outlet 19. A plurality of electromagnetic shield assemblies, each comprising first and second electromagnetic shield layers 36, 46, are positioned to run adjacent to the transverse portion 68 of the inhalation passage 62 on opposite sides thereof. With this arrangement, the electromagnetic shield assemblies at least partially overlap each other so that the first axial end of the induction coil 32 is substantially shielded by the electromagnetic shield layers 36, 46.

Figure 6:
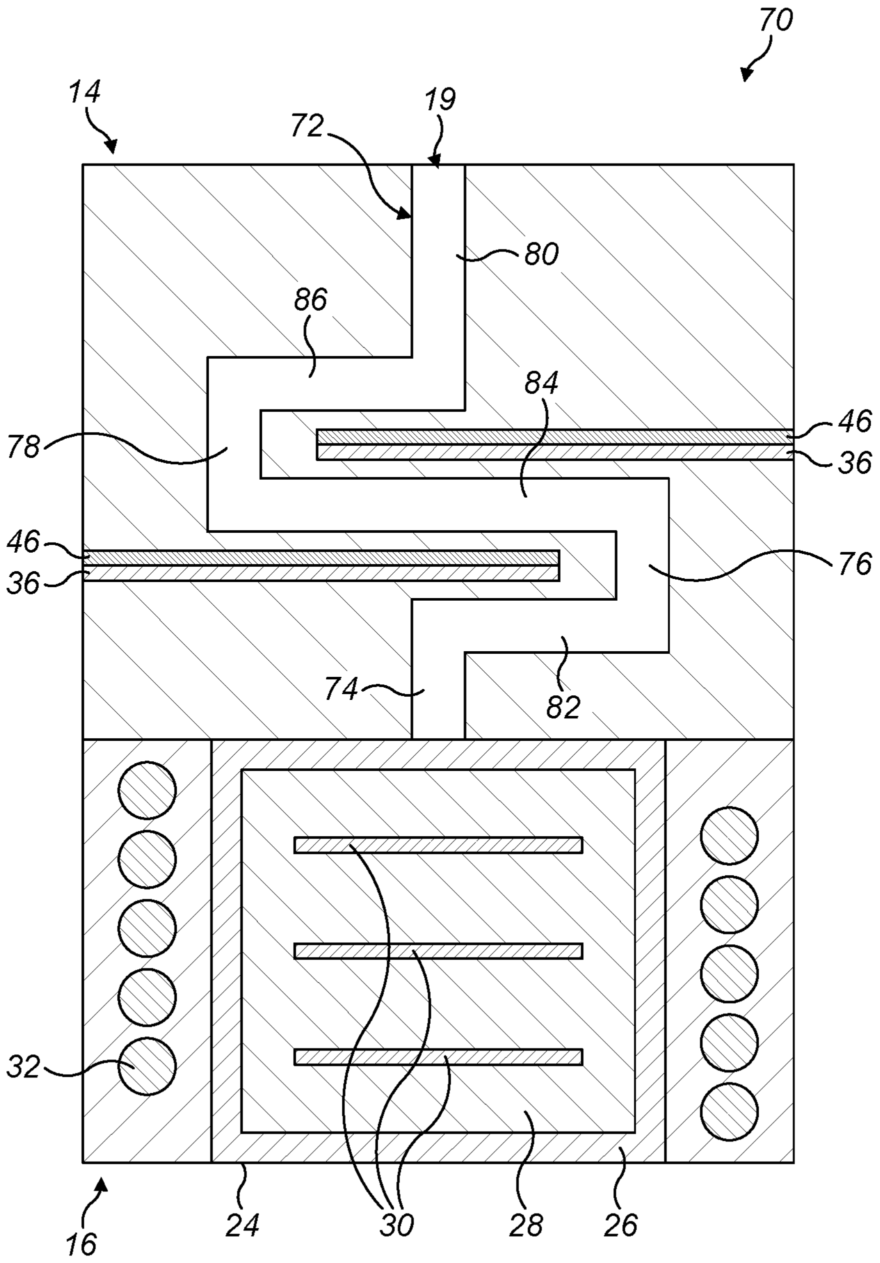
FIG. 6 is a diagrammatic illustration of part of an induction heating assembly according to a third embodiment of the present disclosure.

Referring now to FIG. 6, there is shown part of a third embodiment of an induction heating assembly 70 for a vapour generating device 10. The induction heating assembly 70 shown in FIG. 6 is similar to the induction heating assembly 60 shown in FIG. and corresponding components are identified using the same reference numerals.

The induction heating assembly 70 comprises an inhalation passage 72 which extends from the heating compartment 24 to the air outlet 19 at the first axial end 14 of the induction heating assembly 70. The inhalation passage 72 comprises first, second, third and fourth axial portions 74, 76, 78, 80 which extend in a direction substantially parallel to the axial direction between the heating compartment 24 and the air outlet 19. The inhalation passage 72 also comprises first, second and third transverse portions 82, 84, 86 which extend in a direction substantially perpendicular to the axial direction between the heating compartment 24 and the air outlet 19. A plurality of electromagnetic shield assemblies, each comprising first and second electromagnetic shield layers 36, 46, are again positioned to run adjacent to the transverse portions 82, 84, 86 of the inhalation passage 72 on opposite sides of the transverse portion 84. With this arrangement, it will again be seen that the electromagnetic shield assemblies at least partially overlap each other so that the first axial end of the induction coil 32 is substantially shielded by the electromagnetic shield layers 36, 46.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A vapour generating device, comprising:

a heating compartment arranged to receive an induction heatable cartridge;

an induction coil extending around the heating compartment;

a first electromagnetic shield layer arranged outward of the induction coil;

a first insulating layer positioned between the induction coil and the first electromagnetic shield layer; and a second electromagnetic shield layer arranged outward of the first electromagnetic shield layer;

wherein the first and second electromagnetic shield layers differ in one or both of their electrical conductivity and their magnetic permeability.

2. The vapour generating device according to claim 1, wherein one of the first and second electromagnetic shield layers comprises a ferrimagnetic, non-electrically conductive material; and another of the first and second electromagnetic shield layers comprises an electrically conductive material.

3. The vapour generating device according to claim 1, wherein the first electromagnetic shield layer comprises a ferrimagnetic, non-electrically conductive material; and the second electromagnetic shield layer comprises an electrically conductive material.

4. The vapour generating device according to claim 1, wherein the first electromagnetic shield layer comprises a plurality of layers.

5. The vapour generating device according to claim 4, wherein the plurality of layers comprises one or more layers of ferrite and one or more layers of an adhesive material.

6. The vapour generating device according to claim 1, wherein the first electromagnetic shield layer has a thickness between 0.1 mm and 10 mm.

7. The vapour generating device according to claim 1, wherein the first electromagnetic shield layer has a thickness between 0.1 mm and 0.7 mm.

8. The vapour generating device according to claim 1, wherein the second electromagnetic shield layer has a thickness between 0.1 mm and 0.5 mm.

9. The vapour generating device according to claim 1, wherein the second electromagnetic shield layer has a resistance value of less than 30 mΩ.

10. The vapour generating device according to claim 1, wherein the second electromagnetic shield layer comprises a substantially cylindrical shield portion.

11. The vapour generating device according to claim 1, wherein the second electromagnetic shield layer comprises a substantially cylindrical sleeve.

12. The vapour generating device according to claim 1, wherein there is no electrically conductive material between the induction coil and the first electromagnetic shield layer.

13. The vapour generating device according to claim 1, wherein the second electromagnetic shield layer is an outermost layer of the vapour generating device.

14. The vapour generating device according to claim 1, further comprising an outer housing layer surrounding the first and second electromagnetic shield layers.

15. The vapour generating device according to claim 1, further comprising a second insulating layer, wherein a part of the second insulating layer lies, in use, between the induction coil and a vaporisable substance inside the induction heatable cartridge.

16. The vapour generating device according to claim 15, wherein the second insulating layer is non-electrically conductive and has a relative magnetic permeability less than, or substantially equal to, 1.

17. The vapour generating device according to claim 16, wherein the second insulating layer comprises a plastic material.

18. The vapour generating device according to claim 1, further comprising a power source; and circuitry, wherein the power source and the circuitry are configured to operate in the MHz range.

19. A system, comprising:

the vapour generating device according to claim 1; and a disposable cartridge comprising a vaporisable substance and one or more susceptors;

wherein, in use, the disposable cartridge is removably received in the heating compartment of the vapour generating device.

20. The system according to claim 19, wherein the disposable cartridge is in the shape of a stick.

* * * * *